Patented Aug. 19, 1941

2,252,725

UNITED STATES PATENT OFFICE 2,252,725

PHENOLIC SUGAR ALCOHOL

Joseph B. Niederl, Brooklyn, N. Y.

No Drawing. Application August 28, 1937,
Serial No. 161,414

4 Claims. (Cl. 260—474)

This application is a continuation of the co-pending application Serial No. 89,770, filed July 9, 1936. In this co-pending application it has been demonstrated that aliphatic aldehydes condense with equimolar quantities of a phenol to give a polymeric condensation product, which upon pyrolysis yields the corresponding saturated alkyl phenol. The reaction has also been fully described in the Journal of the American Chemical Society, vol. 59, p. 1113 (1937) under the title "Equimolar Condensations of Aldehydes with Phenols. The Preparation of Primary Saturated Alkylphenols."

The invention described in this application relates to the condensation of reducing sugars with equimolar quantities of a phenol or phenolic compound under essentially similar reaction conditions as described in the above co-pending application.

But, whereas, in the case of the plain aliphatic aldehydes, unsaturated polymeric condensation products are first obtained, which have to be distilled to give the corresponding alkylated phenols, in the case of the reducing sugars the corresponding sugar alcohols are the primary condensation products, and no pyrolysis or distillation of the initial condensation product is necessary.

Since the condensation is most suitably carried out in glacial acetic acid solution, the crude condensation product is usually partially acetylated. Treatment of this product with boiling water or dilute alkalies results in the formation of the free phenolic sugar alcohol. These phenolic sugar alcohols show both phenolic reactions as well as the reactions of a polyhydric alcohol. Thus these phenolic sugar alcohols undergo the usual precipitation reactions with bromine water, formaldehyde, proteins, etc. Some of these sugar alcohols yield sodium salts which are insoluble in ethyl alcohol. These sodium salts are best obtained by treating the alcoholic solution of the phenolic sugar alcohol with sodium alcoholate. These new phenolic sugar alcohols also give the usual color reactions associated with a free phenolic hydroxyl group. Thus they give a positive test with ferric chloride and with mercurous chloride and undergo diazotization reactions with diazonium salts.

The characteristics of the polyhydroxylic alkyl radical manifest themselves primarily in an increased solubility of the phenolic sugar alcohols in water. The multiple hydroxyl groups allow the formation of the respective mono and poly esters and ethers. Furthermore, these hydroxyl groups permit profound chemical modification of the molecule by the use of appropriate oxidation methods. Thus phenolic polyhydroxy aldehydes, ketones and acids are obtainable.

The term "reducing sugars" includes any sugar or sugar-like compound having a free carbonyl group, either aldehydic or ketonic. It also includes mono-, di- and higher poly-saccharides. More specifically, it includes aldoses such as d-glucose, d-mannose, d-galactose, d-arabinose, d-erythrose and glyceria aldehyde. It also includes ketoses such as d-fructose.

The term "phenol" or "phenols," or "phenolic compound" includes monohydroxy benzenes such as phenol itself, and the alkylated homologues of phenol, such as the three cresols, the three xylenols, thymol, carvacrol, butyl-, amyl-, hexyl-, heptyl- and octyl-phenols. Also included in this term are: phenolic compounds carrying another substituent such as a carbonyl group, either aldehydic or ketonic, an alkylol group, a carboxyl group, an ester or ether group. Thus, salicyl aldehyde, p-hydroxy acetophenone, salicylic acid, alkyl salicylates, acetyl salicylic acid (aspirin), guaiacol, vanillin, etc., can be used in this condensation process. The above term "phenol" also includes polynuclear phenolic compounds such as alpha and beta naphthols, hydroxy anthracenes, phenanthrols, etc. The term "a phenol" as used in the claims appended hereto refers to a member of this broad class of hydroxy aromatic compounds.

As a condensing agent hydrochloric acid has been proven most effective, although other mineral acids or salts with a decided acidic reaction may be used. The use of a solvent, which may or may not be entirely inert, is often of advantage. Thus the use of glacial acetic acid as a solvent, concurrently with dry hydrogen chloride gas as the condensing agent, has proven to give the best results. The reaction may be carried out at zero degree centigrade, at room temperature, or at an elevated temperature. Thus, in certain cases, a temperature of 50 degrees centigrade has been found beneficial to the reaction.

The term "phenolic sugar alcohols" includes phenolic derivatives of hexites (hexa-hydroxy hexanes) such as 1- or 2-hydroxy-phenyl sorbitols, hydroxy-phenyl mannitols; of pentites (penta-hydroxy pentanes) such as hydroxy-phenyl arabitol, etc. These phenolic sugar alcohols must not be confused with the isomeric phenyl glucosides, which have no free phenolic hydroxyl group, and in which the phenyl radical is linked to the sugar radical by an oxygen bridge. In the phenolic sugar alcohols, however, there is always a free phenolic hydroxyl group, and the linkage is from carbon to carbon. The phenol apparently adds on to the carbonyl group in the reducing sugars in a manner similar to the addition of hydrocyanic acid to the same types of compounds. In analogy to this, these new phenolic sugar alcohols may be termed "phenol hydrins."

Their general formula is:

$$HOC_6R_4(CHOH)_xCH_2OH$$ or $$HOC_6R_4C(OH)(CH_2OH)(CHOH)_xCH_2OH,$$ or the dehydrates thereof, in which R represents hydrogen or an alkyl radical, or any other functional group, such as carbonyl, carboxyl, ester or ether group. The total number of carbon atoms of the poly-hydroxylic alkyl radical, which is secondary in case an aldose is used in the condensation, or tertiary in case of a ketose, equals the number of carbon atoms present in the original reducing sugar, that is if the sugar itself is not hydrolyzeable under the reaction conditions of the condensation.

Condensation products with two molecules of the phenol of the type $$CH_2OH(CHOH)_x(CH_2OH)C(C_6R_4OH)_2$$

have also been observed, particularly in cases where a ketose has been employed in the initial condensation process.

The most outstanding and valuable characteristic of these new phenolic sugar alcohols or phenol hydrins is their increased solubility in water. This increased solubility manifests itself particularly in case of the condensation product from d-glucose and phenol. In this case even a 50% solution can be prepared without difficulty. The condensation product obtainable from d-glucose and aspirin results in the formation of a sorbitol substituted aspirin or salicylic acid, or salicylic acid derivative, which is extremely soluble in water. The same applies to the cases of the water insoluble phenols such as thymol, carvacrol and their homologues.

In every case, due to the intramolecular introduction of a poly-hydroxylic alkyl radical into the phenolic compound, increased water solubility of the condensation product results.

These phenolic sugar alcohols have valuable germicidal and bactericidal properties. Hence they are extremely useful in antiseptic preparations, particularly where a higher concentration of the phenol is desired.

These phenolic sugar alcohols also serve as valuable intermediates. Thus, through the application of suitable mild oxidation methods, the real phenolic reducing sugars are obtainable, which in turn show extremely interesting physiological properties. More radical oxidation methods result in the formation of phenolic-poly-hydroxylic acids, which are particularly suitable for a number of special uses: as for instance, in the tanning industry.

Bromination by the usual methods produces bromine derivatives which show an increased solubility in water, and hence are suitable for pharmaceutical preparations, where such increased water solubility is desired.

Diazotization with diazonium salts, which can be prepared from primary aromatic amines, yields the corresponding dye stuffs which contain a sugar alcohol radical in their molecule. This again affects the physical, chemical and physiological properties of such dye stuffs.

Treatment of these phenolic sugar alcohols with formaldehyde in alkaline medium, results in the formation of Bakelite-like condensation products, which show characteristic solubility properties, and hence these types of Bakelite-like condensation products may be utilized for special purposes.

While excessive nitration in hot results in the formation of the respective poly nitro phenol and oxidation products usually found in the oxidation of the reducing sugar employed in the condensation, controlled nitration introduces not only nitro groups into the aromatic nucleus, but also produces poly nitrates in the poly-hydroxylic alkyl radical. These nitrated phenolic sugar alcohols thus are powerful explosives, as they combine the detonation properties of a poly-nitro aromatic explosive, such as picric acid, or the poly nitro cresols (ecrasite), together with the poly-nitrates of poly-hydroxy compounds, such as nitro glycerine (dynamite), nitro cellulose (gun cotton), etc.

EXAMPLE 1. D-GLUCOSE AND PHENOL

*Technical process*

4.7 kilograms of carbolic acid are dissolved in 20 liters of glacial acetic acid in a suitable container constructed of acid resisting material and provided with a reflux condenser, a mechanical stirrer, a gas inlet tube and a gas outlet tube. The gas inlet tube has to extend to the bottom of the reaction vessel. 9 kilograms of anhydrous dextrose are slowly added to the solution under constant stirring. After addition of the sugar, the system is closed and a vigorous stream of dry hydrogen chloride gas is introduced into the reaction mixture, and maintained until the dextrose has completely dissolved and the reaction mixture has become homogenous and reddish-brown in color. The reaction mixture is then concentrated in vacuo at about 20 mm. pressure and at a temperature not exceeding 70 degrees centigrade, to about half of its original volume. The resulting syrup, containing the condensation product, the partially acetylated hydroxy-phenyl-sorbitol, unreacted dextrose and carbolic acid, as well as acetic acid and hydrochloric acid, is then subjected to further purification procedures. These procedures depend chiefly upon the subsequent use of the hydroxy-phenyl-sorbitol. For technical, pharmaceutical, or medicinal preparations, the purification procedure can be suitably modified and simplified. Such purification procedures involve the use of steam distillation to remove the acids as well as any unreacted phenol. Another such simplified purification procedure would involve hydrolysis with barium hydroxide and subsequent removal of the barium ion by calculated amounts of sulfuric acid, followed by concentration of the filtrate in vacuo. Since most commercial preparations do not require the use of the pure, solid and dried product, but merely aqueous, or alcoholic solutions of the phenolic sugar alcohol, further modifications of the purification process may be resorted to.

Any changes in the ensuing purification procedure of the initial condensation product, as well as changes in the type of the reactants (other reducing sugars, other phenols, etc.) does not constitute a departure from the original scope of this invention.

Laboratory process 47 grams of phenol (½ mole) is dissolved in 200 cc. of glacial acetic acid in a 2 liter three-necked round-bottomed flask provided with a reflux condenser, a gas inlet tube which extends to the bottom of the flask, and a stirrer. 90 grams of anhydrous d-glucose (½ mole) are then added to the above solution of the phenol in glacial acetic acid. A vigorous stream of dry hydrogen chloride gas is then passed through the system at a temperature of 25 degrees centigrade. After two and one half hours a dark reddish-brown homogenous mixture results. The homogeneity of the reaction mixture is one of the indications of the completion of the reaction. This reaction mixture is then concentrated to about half of its original volume in vacuo (20 mm. pressure) at a temperature not exceeding 70 degrees centigrade. A viscous syrup is thus obtained. After standing for 24 hours in an open dish, the syrup is treated in the cold with a 10% barium hydroxide solution until the mixture remains alkaline on repeated shaking. After an additional 24 hours the insoluble material is filtered off and carbon dioxide gas is passed through the clear alkaline filtrate until the solution is neutral to litmus. The precipitate of barium carbonate is filtered off and the solution is evaporated in vacuo (20 mm. pressure) at 70 degrees centigrade to a heavy, viscous syrup. This syrup is then diluted with 10 to 15 parts of hot absolute ethyl alcohol. This causes the precipitation of barium acetate and unreacted d-glucose, both of which are removed from the alcoholic solution of the phenolic sugar alcohol either by centrifuging or by filtration. The filtered alcoholic solution is again concentrated in vacuo until a light-brown, heavy syrup is obtained. This syrup, consisting chiefly of the phenolic sugar alcohol, is placed in a desiccator over phosphorous pentoxide. After standing for 8 to 10 hours the syrup turns solid.

In the laboratory procedure for the preparation of the hydroxy-phenyl-sorbitol, the d-glucose may be substituted by any other aldose, such as d-mannose, d-galactose, d-arabinose, etc. Such a substitution with other aldoses still being within the scope of this invention.

1-Hydroxy-phenyl-sorbitol
*(Phenol hydrin of d-glucose)*

The 1-hydroxy-phenyl-sorbitol, as produced in the process as described in Example 1, is soluble in water in all proportions. It is very hygroscopic. Its melting point is somewhat indistinct (about 80 degrees centigrade) and it decomposes at about 105 degrees centigrade. The compound is optically active, its optical rotation being:

$$(\alpha)_D^{31°C} = +79.1°$$

It gives no reaction with ferric chloride in dilute aqueous solution, but its concentrated alcoholic solution gives a greenish-brown, while mercurous salts produce an intense red coloration. Diazotization reactions are positive. With diazotized p-nitro aniline an intense reddish-brown coloration, followed by a precipitate of the same color, is produced. Treatment with an excess of conc. nitric acid at steam bath temperature results in the formation of picric acid in amounts of one mole of picric acid for each mole of the phenolic sugar alcohol, or phenol hydrin. In this same process water soluble products are formed, as has been observed in the treatment of sorbitol under similar conditions.

Sodium salt of 1-hydroxy-phenyl sorbitol

A 10% excess of a mole equivalent of metallic sodium is dissolved in as little ethyl alcohol as possible. One mole equivalent of the phenolic sugar alcohol is also dissolved in ethyl alcohol. The product need not be pure. The sodium alcoholate solution is slowly added to the alcoholic solution of the phenolic sugar alcohol. The sodium salt of the hydroxy-phenyl-sorbitol, which is also optically active, precipitates out immediately. The precipitate is filtered off as rapidly as possible and is then dried in a desiccator over phosphorous pentoxide. The salt is also optically active; its rotation is:

$$(\alpha)_D^{25°} : +12° \text{ (approx.)}$$

Acetyl derivative 3 grams of the hydroxy-phenyl-sorbitol is treated with 15 cc. of acetic acid anhydride in the presence of 1.5 grams of powdered fused sodium acetate. The mixture is then heated on a steam bath for 2 hours. At the end of this time the warm solution is poured into 100 cc. of ice water. The residue is removed by filtration and is recrystallized from alcohol. Melting point about 78 degrees centigrade.

Bromine derivative

To the aqueous solution of the original hydroxy-phenyl-sorbitol bromine water is added in excess. On standing, the bromine derivative precipitates out. It is recrystallized from alcohol. Melting point: 118 degrees centigrade.

Example 2. d-Galactose and m-Cresol 54 grams of m-cresol (½ mole) are dissolved in 200 cc. of glacial acetic acid in a suitable round-bottomed flask provided with a reflux condenser, a stirrer, a gas inlet and a gas outlet tube. To this solution is added 90 grams of anhydrous d-galactose and the reaction mixture stirred well. Then a vigorous stream of dry hydrogen chloride gas is introduced until the reaction mixture becomes homogenous and reddish-brown in color. The progress of the condensation is followed by occasionally withdrawing a small portion of the reaction mixture and pouring it into water. As long as droplets form, the reaction is incomplete, whereas a solid precipitate is an indication of the completion of the reaction. The reaction mixture is then heated to about 50 degrees centigrade while the introduction of the hydrogen chloride gas is continued. If the reaction is still not complete, the reaction mixture is allowed to stand in a closed system for 24 hours, while still saturated with hydrogen chloride gas. From time to time the progress of the condensation is followed in the manner described above. As soon as a solid precipitate is obtained when pouring a small portion of the reaction mixture into water, the entire reaction material is treated in a similar manner. The supernatant aqueous layer is withdrawn and the residue washed repeatedly, first with cold and later with hot water. After these exhaustive washings, the condensation product is dissolved in sodium hydroxide solution, filtered and reprecipitated by cautious addition of dilute hydrochloric acid, or by the introduction of carbon dioxide gas into the filtered alkaline solution. The crude condensation product may be further purified by any of the methods described previously.

Example 3. d-Glucose and Thymol 75 grams of thymol (½ mole) are dissolved in 200 cc. of glacial acetic acid in a container provided with a reflux condenser, stirrer and gas inlet and gas outlet tube. To this solution 90 grams of anhydrous d-glucose are added and the mixture well stirred. A vigorous stream of dry hydrogen chloride gas is passed into this mixture until it becomes homogenous and reddish-brown in color. The mixture is then heated on a steam bath at a temperature not exceeding 50 degrees centigrade for an additional 2 hours. Then the flask is stoppered and the reaction mixture, which is saturated with hydrogen chloride gas, is allowed to stand for at least 24 hours. The progress of the condensation is again ascertained by pouring a small amount of the reaction material into water. As long as oily droplets form, the reaction is incomplete and the reaction is allowed to stand for an additional 24 hours. However, as soon as a solid precipitate forms in this test, the entire reaction mixture is poured into water. The water layer is removed and the condensation product is repeatedly washed first with cold and then with hot water until all water-soluble acids are removed. Then the condensation product is dissolved in alkali, from which it is reprecipitated either with dilute hydrochloric acid or with carbon dioxide.

The three xylenols, carvacrol, the propyl-, the butyl-, the amyl-, hexyl-, heptyl- and octyl-phenols, guaiacol, etc., can be condensed with d-glucose, d-mannose, d-galactose, or any other aldose in a similar manner, with or without minor variations in the procedure, which do not constitute a deviation from the original scope of this invention.

Example 4. d-Glucose and Acetyl Salicylic Acid 90 grams of acetyl salicylic acid (aspirin) are dissolved in 300 cc. of glacial acetic acid in a container provided with a stirrer, a reflux condenser, a gas inlet and a gas outlet tube. To this solution is added under constant stirring 90 grams of anhydrous d-glucose. Into this mixture a vigorous stream of dry hydrogen chloride gas is introduced until the reaction mixture becomes homogenous. The reaction mixture is then poured into water and the reaction product, the partially acetylated aspirin-sorbitol, is washed repeatedly with cold water. The condensation product is then hydrolyzed with boiling water or with dilute alkalies; a completely water-soluble sorbitol-salicylic acid is thus produced. The product has extremely valuable medicinal properties.

In a similar manner other esters and ethers of salicylic acid, such as methyl- or ethyl salicylate can be condensed with d-glucose, d-galactose, d-fructose, or any other reducing mono saccharide.

Example 5. d-Glucose and Alpha-Naphthol 72 grams of alpha naphthol (½ mole) are dissolved in 300 cc. of glacial acetic acid in a suitable container provided with a stirrer, a reflux condenser and a gas inlet and a gas outlet tube. The gas inlet tube has to extend to the bottom of the reaction vessel. To this mixture are added 90 grams of anhydrous d-glucose under constant stirring. After completion of the addition of the hexose a vigorous stream of dry hydrogen chloride gas is introduced into the reaction system. Again the passing in of the dry hydrogen chloride gas is continued until a homogenous solution is formed, indicating completion of the reaction. The reaction mixture is then poured into water, the supernatant water removed and the remaining condensation product repeatedly treated with cold and hot water. It is finally dissolved in alkali and reprecipitated from its filtered alkaline solution by dilute hydrochloric acid or by carbon dioxide gas. The further purification procedure is the same as described in the foregoing examples.

Instead of alpha naphthol, its isomer, the beta naphthol, can be used. Also, the reducing sugar may be varied. Thus, it is possible to condense any of the reducing sugars with poly-nuclear-phenolic compounds under more or less similar reaction conditions.

Example 6. d-Fructose and Phenol 47 grams of phenol (½ mole) are dissolved in 200 cc. of glacial acetic acid in a 2 liter three-necked round-bottomed flask provided with a reflux condenser, a stirrer, a gas inlet and a gas outlet tube. The gas inlet tube should extend to the bottom of the reaction vessel. 90 grams of anhydrous d-fructose (½ mole) are added to the solution under constant stirring. After completion of addition of the ketose a vigorous stream of dry hydrogen chloride gas is introduced into the reaction system. An even temperature of not more than 25 degrees centigrade is maintained throughout the entire condensation reaction. After 2 hours, and as soon as the mixture has become homogenous and reddish brown in color, the reaction is stopped. A small portion of the reaction mixture is withdrawn and poured into water; the formation of a solid, water insoluble precipitate indicates completion of the reaction. The reaction mixture may either be poured into water and treated as described in Examples 2 to 5, or it may be worked up in a manner similar to the one described in Example 1 under the laboratory process.

The condensation product, the 2-hydroxyphenyl-sorbitol, is soluble in water in all proportions. It is very hygroscopic. Its melting point is indistinct and at about 110 degrees centigrade it appears to undergo decomposition. The product is optically active. It also yields a sodium salt which is insoluble in ethyl alcohol. Treatment with conc. nitric acid results in the formation of picric acid and other water soluble oxidation products, usually found in the oxidation of sorbitol itself. Its bromine derivative melts at 105 degrees centigrade.

I claim:

1. As a new water-soluble compound sorbitol salicylic acid.

2. The process of producing nuclear carboxylated phenolic hexites which comprises reacting a molar mixture of acetyl salicylic acid and d-glucose with the aid of a strongly acidic condensing agent at a temperature not exceeding about 70° C.

3. The process of preparing sorbitol salicylic acid which comprises reacting a molar mixture of d-glucose and salicylic acid in the presence of a strongly acidic condensing agent at a temperature not exceeding 70° C.

4. The process which comprises mixing a saccharide and a phenol under substantially anhydrous conditions and reacting the resulting mixture with the aid of a dry strongly acidic condensing agent at a temperature not exceeding about 70° C.

JOSEPH B. NIEDERL.

DISCLAIMER 2,252,725.—*Joseph B. Niederl*, Brooklyn, N. Y. PHENOLIC SUGAR ALCOHOL. Patent dated August 19, 1941. Disclaimer filed September 5, 1942, by the inventor.

Hereby enters this disclaimer to that part of the specification which appears in the following words, to wit:

Page one, second column, in lines 21 and 22, "a carboxyl group, an ester"; in lines 23 and 24, "salicylic acid, alkyl salicylates, acetyl salicylic acid (aspirin)".

Page two, first column, in lines 40 to 44, "The condensation product obtainable from d-glucose and aspirin results in the formation of a sorbitol substituted aspirin or salicylic acid, or salicylic acid derivative, which is extremely soluble in water."

Page 4, first column, in lines 38 to 60,

"EXAMPLE 4. D-GLUCOSE AND ACETYL SALICYLIC ACID 90 grams of acetyl salicylic acid (aspirin) are dissolved in 300 cc. of glacial acetic acid in a container provided with a stirrer, a reflux condenser, a gas inlet and a gas outlet tube. To this solution is added under constant stirring 90 grams of anhydrous d-glucose. Into this mixture a vigorous stream of dry hydrogen chloride gas is introduced until the reaction mixture becomes homogenous. The reaction mixture is then poured into water and the reaction product, the partially acetylated aspirin-sorbitol, is washed repeatedly with cold water. The condensation product is then hydrolyzed with boiling water or with dilute alkalies; a completely water-soluble sorbitol-salicylic acid is thus produced. The product has extremely valuable medicinal properties.

In a similar manner other esters and ethers of salicylic acid, such as methyl- or ethyl salicylate can be condensed with d-glucose, d-galactose, d-fructose, or any other reducing mono saccharide.";

and disclaims claims 1, 2, and 3.

[*Official Gazette October 13, 1942.*]